United States Patent [19]

Davis, Jr.

[11] Patent Number: 5,211,253
[45] Date of Patent: May 18, 1993

[54] METHOD AND APPARATUS FOR COMBINATION WEIGHER

[75] Inventor: Thornton R. Davis, Jr., Albany, Calif.

[73] Assignee: The Paxall Group, Skokie, Ill.

[21] Appl. No.: 778,273

[22] Filed: Oct. 17, 1991

[51] Int. Cl.$^5$ .............................................. G01G 13/16
[52] U.S. Cl. ........................................ 177/25.18; 177/1
[58] Field of Search .................................... 177/1, 25.18

[56] References Cited

U.S. PATENT DOCUMENTS

| | | | |
|---|---|---|---|
| 4,385,671 | 5/1983 | Hirano | 177/28.15 |
| 4,416,341 | 11/1983 | Hirano | 177/25.18 |
| 4,470,166 | 9/1984 | Hirano | 177/25.18 |
| 4,676,325 | 6/1987 | Yamano et al. | 177/1 |
| 4,709,769 | 12/1987 | Yamano et al. | 177/1 |

Primary Examiner—George H. Miller, Jr.
Attorney, Agent, or Firm—Bacon & Thomas

[57] ABSTRACT

A combination weigher which optimizes the delivered weight of product based on current operating conditions is disclosed. The weigher includes a microprocessor which is programmed to perform a combination search on all of the balances which are in a ready state including any balances which reach the ready state almost immediately before a signal to discharge a selected combination.

6 Claims, 6 Drawing Sheets

METHOD AND APPARATUS FOR COMBINATION WEIGHER

BACKGROUND OF THE INVENTION

This invention relates to an improved apparatus and method for weighing a plurality of articles of varying weights and for delivering a collection of the weighed articles having a combined weight which is at least equal to and which most nearly approximates a predetermined target weight.

In today's competitive environment, food processors and manufacturers are packaging food commodities such as candies, nuts, pasta and the like in conveniently sized packages. In such packaging, it is important to ensure that each package contains at least the stated weight. It is also important to the packagers to minimize any overweight packages since any excess weight, over the stated minimum, represents a serious loss of profit. In a competitive environment, it is also important to operate the weighing and packaging machines at a relatively rapid rate so that the overall costs of packaging and product are minimized.

Over the past decade or so, manufacturers and packagers have advanced the art of rapid packaging, particularly with respect to combination weighers and packaging machines. For example, the U.S. patent of Gordon W. Hays, U.S. Pat. No. 4,313,507, which issued on Feb. 2, 1982, discloses a combination weigher which consistently arrives at a weight portion within an acceptable range. Hays recognized that the number of immediately available articles (ready articles) will usually be significantly greater than the number of average weight articles needed per portion. Hays then selected a combination of ready articles the total weight of which equals or most minimally exceeds the final desired weight of the portion.

Another approach for obtaining a precise weight of a product formed of a plurality of individual articles having various weights is disclosed in U.S. Pat. No. 3,939,928 of Katsuhiko Murakami et al. which issued on Feb. 24, 1976. As disclosed therein, a number of objects are fed to a plurality of weighing hoppers and an electronic circuit is used to test successive combination of hoppers for a combined weight which is equal or most closely approximate to a preselected target weight. The selected hoppers are then unloaded.

Since the number of weighing balances normally selected is a less than the number of remaining ones, it is customary to superpose cycles, which is referred to as interleaving, in order to increase the speed and efficiency of the process. Interleaving is a widely-used method for increasing the speed in multi-scale devices. For example, in 1979 Parson Automatic Scale Company of Berkeley, Calif., now part of The Paxall Group of Skokie, Ill., manufactured a multi-scale unit which incorporated interleaving or overlapped cycles to increase the speed of the weighing process. In that unit, four weigh heads were incorporated. In a first cycle, two heads, each of which weighed a fraction of a total charge, were discharged into a single package. Then, before those two heads were refilled, the third and fourth units, each of which contained a part of a second charge, were discharged into a second package. In essence, the first two scales were excluded from the second selection.

A more detailed description of interleaving is contained in the U.S. patents of Hirano, U.S. Pat. Nos. 4,385,671, 4,470,166 and 4,589,506. The systems defined therein exclude a group of scales which were selected in an initial combination search from a second combination search. While this system allows for an increase in speed, it may not result in an optimum, i.e., most accurate weight of product which is delivered to a package. The reason is that once an initial search has been selected, that selection is fixed and will be discharged into the next available package while a second combination search, which excludes the previous selected group of scales, is initiated.

Accordingly, it now appears that there may be a significant demand for a dynamic method and apparatus for controlling interleaving based on internal parameters and/or external operating parameters. Such apparatus and method would be based on considerations of "ready" scales, i.e., those scales which have been refilled and/or reached a steady state. For example, such apparatus and/or method would consider any and all individual scale(s) which becomes ready after the initial selection process at the time of discharge as opposed to excluding a group or set of previously selected scales. An example of an apparatus which incorporates "ready" or stable scales is disclosed in the U.S. Pat. No. 4,733,363 of Yamada et al. which is incorporated herein in its entirety by reference.

It has now been found that a combination weigher according to the present invention can be used to improve the machine efficiency and desired weight accuracy by means of novel control means for optimizing performance at various production rates. It has also been found that the apparatus and methods according to the present invention provide maximum versatility wherein a combination weigher can accomodate discharge weights or values of very light density products that require a relatively large number of balances to make up a required weight. It is also believed that the combination weigher in accordance with the present invention can be manufactured at a competitive price, readily maintained and efficiently operated and will not add to the demands of the operator. In addition, a weigher in accordance with the present invention can operate over a relatively large range of speeds and target weights with minimal operator input.

SUMMARY OF THE INVENTION

In essence, the present invention contemplates an improved combination weigher which includes means for optimizing the delivered weight of product based on determined operating conditions, i.e., determined from one cycle to the next without operator assistance.

An apparatus according to the present invention weighs a plurality of articles having a combined weight which is at least equal to and which most nearly approximates a predetermined target weight. The apparatus comprises means including a plurality of balances each of which is adapted to receive and weigh a fraction of the collection and unload product therefrom to contribute to a delivery. The apparatus also includes means for recording a predetermined target weight and control means for determining which of the balances are in a ready or stable state. Means are also provided for generating the values of combinations of weights on the balances which are in the ready state and for comparing the values with the predetermined target weight and for selecting a combination of balances to be unloaded to deliver a collection of articles having a combined weight which most nearly approximates the target weight. In practice, it may be desirable to select those scales having a combined weight which is at least equal to the predetermined weight to avoid any underweight packages. The apparatus also includes package positioning and signal generating means such as a packaging machine for positioning a package to receive a collection of articles from the selected balances and for generating a signal to indicate that a package is positioned to receive the articles from the balances. Means for unloading the balances of the selected combination for delivery of the product contained therein to a property positioned package are also provided. Means for generating the values of combinations of weights on the balances which are in the ready state including the originally selected balances and any balances which have reached a ready state subsequent to a first comparison are actuated for comparing the values with the predetermined target weight. In this manner, all of the ready balances are included in the comparison and a second selection having a weight which most nearly approximates the target weight is delivered to a package. Means are also provided for refilling those balances which have been unloaded.

An improved combination in accordance with a preferred embodiment of the invention comprises a combination weigher and a packaging machine for weighing a plurality of articles of product having varying weights and delivering and packaging a collection of the weighed articles having a combined weight which is at least equal to and most nearly approximates a predetermined target weight. The combination includes a plurality of balances each of which receives and weighs a fraction of the collection and unloads product therefrom to contribute to a delivery. The combination includes means for recording a target weight and control means associated with the combination weigher for determining which of the balances are in a ready state. The combination also includes means for generating the values of combinations of weights on the balances which are in the ready state and comparing the values with the predetermined target weight and for selecting a combination of the ready balances to be unloaded to deliver a collection of articles having a combined weight which is at least equal to and which most nearly approximates the target weight. Packaging means, product transfer means and means for unloading the balances of the selected combination to the product transfer means and delivery to the packaging means are provided. In the preferred embodiment, means associated with the packaging machine generates a signal which indicates that the packaging machine is ready to receive a collection of articles of product. Second control means responsive to the signal from the signal generating means generates the values of combinations of weights on the balances which are in the ready state including any balances which have reached a ready state subsequent to a first comparison, including those already selected, and compares the values with the predetermined target weight. Means for loading the balances which have been unloaded and means for initiating operation of the generating and comparing means in response to the unloading of selected balances are also provided. Thus, the initiation of the signal from the second control means provides the selection of the most accurate combination weight from the ready balances or scales including any scales which may have been reloaded from the previous cycle.

The invention also contemplates a method and apparatus for initiating a discharge command signal and an anticipatory command signal which proceeds the discharge command signal by a period of time. The time period is about equal to but slightly greater (for example, 0.1 second greater) than the time required for a combination search. Thus, the anticipatory command signal which may be internally or externally generated, i.e., by an internal timer or by the operation of a packaging machine, initiates a combination search at the latest possible time without delaying a discharge. This approach allows any scales which reach a ready state to be included in the combination search and result in a more accurate weight.

The invention will now be described in more detail in connection with the accompanying drawings.

DESCRIPTION OF THE PREFERRED EMBODIMENTS

As used herein, the term "combination weigher" refers to a device which includes a plurality of scales or balances and a plurality of product hoppers associated therewith, means for delivering a plurality of articles of varying weights to the hoppers for weighing the articles therein, means for selecting a combination of hoppers and for delivering a collection of the weighed articles having a combined weight which is at least equal to and most nearly approximates a predetermined target weight to a package or packaging machine.

The product hoppers or product storage hoppers contain a known weight of articles. For example, the product hoppers may be mounted on a balance or form a part of a scale. In other cases, the product hoppers may be mounted below the scale and the weight value of articles delivered by the scale will be stored in some form of memory means. A more detailed description of the separate hopper concept is disclosed in the U.S. patent of Henry et al., U.S. Pat. No. 4,418,771, which is incorporated herein in its entirety by reference. The product hopper is also fitted with means for unloading the contents thereof in response to a signal from a control means.

In such weighers, a combination search sums the weights corresponding to the amount of product in the hoppers to find a combination of weights which most closely approximates a target weight. A suitable circuit for comparing and selecting balances is disclosed in the U.S. patent of Hirano, U.S. Pat. No. 4,470,166, which is incorporated herein in its entirety by reference.

In describing the invention, it should be recognized that the essential part of the invention lies in the control means and/or logic for generating the values of combinations of weights on the balances. In practicing the invention, a combination search is done as late as possible in a cycle which may allow previously emptied balances to be refilled and included in the combination search. Including additional scales in the search increases the accuracy, i.e., results in a combination weight which more closely defines a target weight.

For comparison, the prior art combination weighers make a combination search and then exclude all of the selected scales from the next search. Therefore, in those cases where one or more of the previously selected scales have been refilled before a demand from the packaging machine, it will not be included in the comparison cycle.

Figure 1:
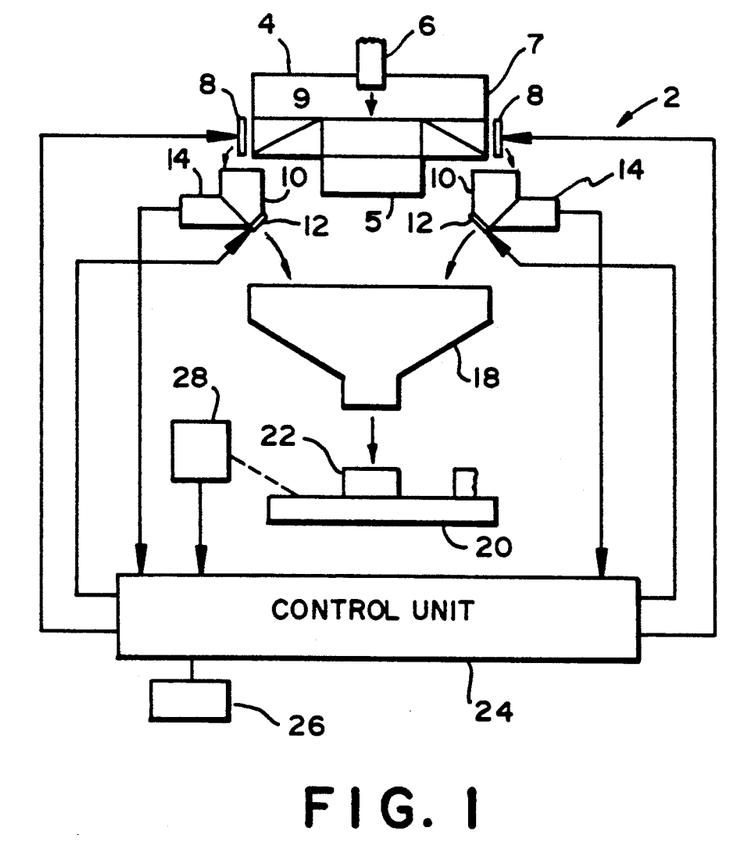
FIG. 1 is a schematic illustration of a combination weigher, packaging machine and control means in accordance with a first embodiment of the invention.
Figure 2:
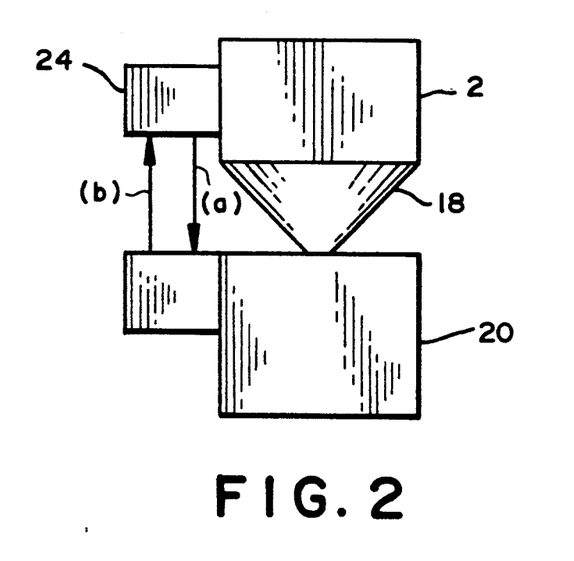
FIG. 2 is a schematic illustration of a combination weigher, packaging machine and control means.
Figure 2B:
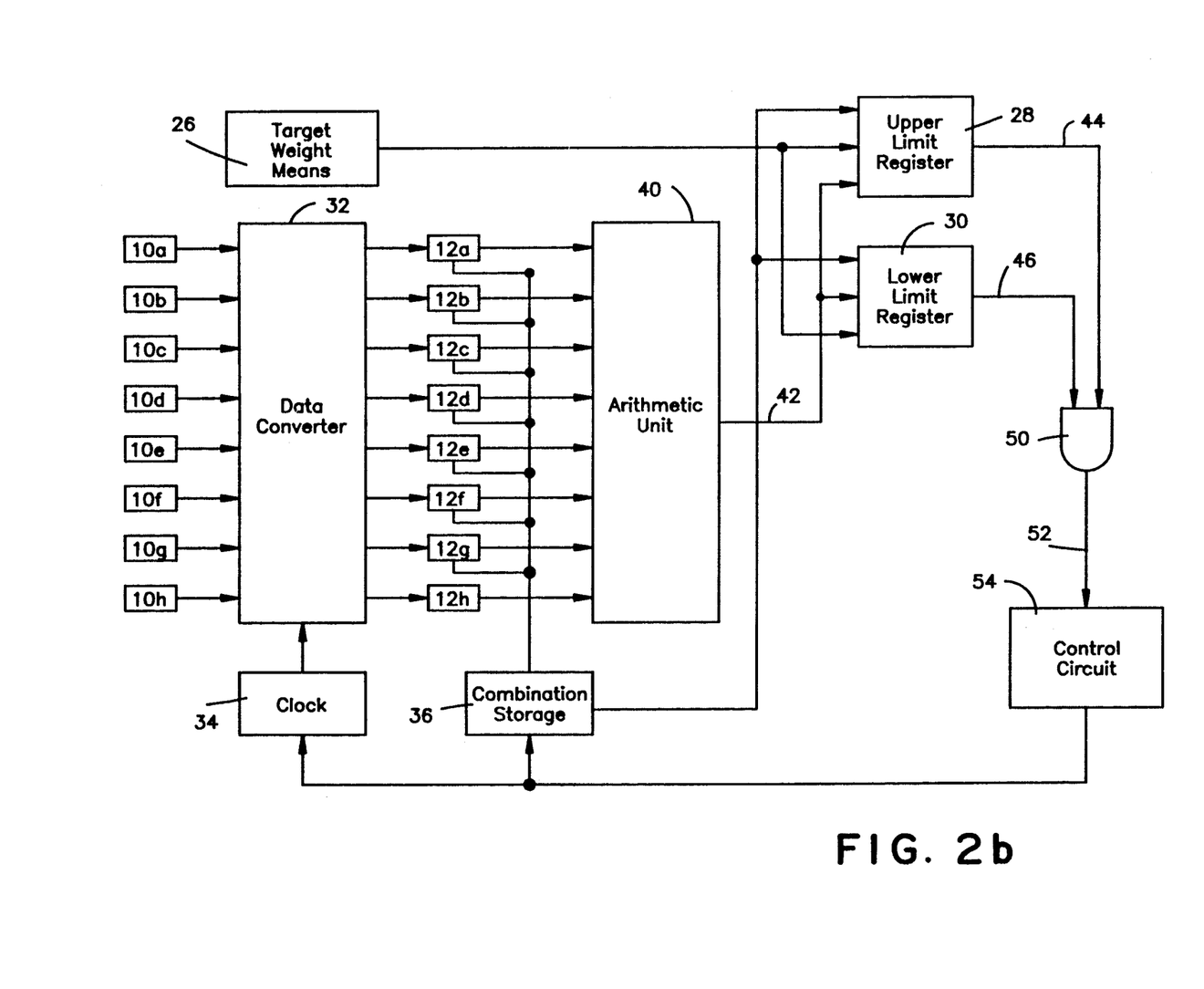
FIG. 2b is a block diagram which represents a combination weigher.

As illustrated in FIGS. 1, 2 and 2b, a combination weigher 2 includes feed means such as a product distributor 4 for receiving a plurality of articles from a source or conveyor 6. The conveyor 6 feeds a mass of product which is made up of discreet articles such as candies, nuts, pasta, pretzels or the like to the distributor 4 for packaging in conveniently sized packages.

The distributor 4 is of a convention design and may include support 5. The distributor 4 may also include means (not shown) for rotating distributor 4 to delivery product from conveyor 6 to a peripheral part thereof. For example, product may be directed to an outer peripheral wall 7 by means of a vibrator (not shown) and/or by a sloping base 9 so that a plurality of articles will flow outwardly against wall 7.

The peripheral wall 7 also includes a plurality of exit ports (not shown) in a lower portion thereof spaced about the circumference of wall 7. Each of the exit ports has a gate 8 associated therewith which are normally closed and selectively opened as will be described hereinafter.

A plurality of scales or weighing hoppers 10 are disposed around distributor 4 and below gates 8. Thus, when gates 8 are open a plurality of articles of product will flow from distributor 4 through the exit ports and into weighing hoppers 10. Each of the weighing hoppers 10 also includes a gate 12 which is normally closed and selectively opened for unloading thereof.

The weighing hoppers 10 are operatively connected to weight sensors and first control means 14 which produce and receive electrical signals. The signals produced are indicative of the weights of articles in each of the hoppers 10.

A common collecting hopper 18 is disposed immediately below weighing hoppers 10 and is adapted to direct product which is discharged from weighing hoppers 10 in response to a signal received by first control means 14 to open gate 12 which then dumps the product into collecting hopper 18 for delivery to product receiving means 20. This package receiving means 20 may be of any conventional design as will be well understood by those skilled in the art. The product receiving means is adapted to position a package 22 directly under collecting hopper 18 for receiving a preselected amount of product.

A control unit 24 is operatively connected to target weight means 26 and second control means 28. The control unit 24 receives and records a target weight from target weight means 26 which may be a simple key pad for entering a minimal weight and/or an acceptable range of weights. The control unit 24 also receives the weight fractions contained in each ready weighing hopper 10 from first control means 14. The control unit 24 includes means for recording a predetermined target weight. It also includes means for generating the values of combinations of weights in the weighing hoppers 14 which are in the ready state and for comparing the values with the recorded target weights and for selecting a combination of weighing hoppers to be unloaded to deliver a collection of articles having a combined weight which is at least equal to and which most nearly approximates the target weight. Thus, after selecting the combination the control unit 24 delivers a signal to first control means 14 to open gates 12 for the selected weight hoppers and unloads those hoppers 10 for delivery of product into collecting hopper 18 and package 22.

The circuitry and/or control logic for control unit 24 is of conventional design insofar as the selection and comparison steps. One such system is described in the U.S. patent of Henry et al., U.S. Pat. No. 4,481,771, which is incorporated herein in its entirety by reference.

As illustrated in FIG. 2b, one embodiment of control unit 24 includes a means, such as a keyboard or remote computer, for inputting a target weight 26 for inputting the desired weight of the product. For example, the target weight means could indicate a minimal weight such as four ounces or 8 ounces as well as an acceptable limit such as a plus one percent.

Upper and lower limit registers 28 and 30 are provided for comparing the total product weight in a selected combination of weighing hoppers 10 with an incremental form of the desired weight. In other words, the upper and lower limit registers determine whether a selected combination includes a total weight lying within an acceptable range. The registers 28 and 30 store increments for addition to or subtraction from the desired weight signal which is provided by target weight means 26. The increments are added to provide the upper and lower limits of the acceptable range.

A data converter 32 is clocked by a clock 34 to read in the weights of product in hoppers 10a through 10h as provided by first control means 14a through 14h. Then, a data converter 32 transfers the data input from hoppers 10a through 10h. A combination storage 36 stores all combinations of a preselected number of weigh hoppers 10a through 10h such as a combination of three hoppers to be tested. The signals generated by the stored combinations are used to enable combinations of weight signals from data converter 32 to an arithmetic unit 40.

The arithmetic unit 40 adds the signals representing the weights of selected combinations and produces a signal representing the total or combined weights of the selected weigh hoppers to the upper and lower limit registers 28, 30 via a connecting path 42. The total weight is compared within upper and lower limit registers 28 and 30 against the incremental values of the desired weight. If the comparison is favorable, the appropriate registers 28 and 30 produce a logic signal on lines 44 and 46. A favorable comparison for upper register 28 is determined when the total weight is no greater than the incremental desired weight. Similarly, a favorable comparison for lower limit register 30 is made when the total weight is no lower than the desired weight.

Figure 3:
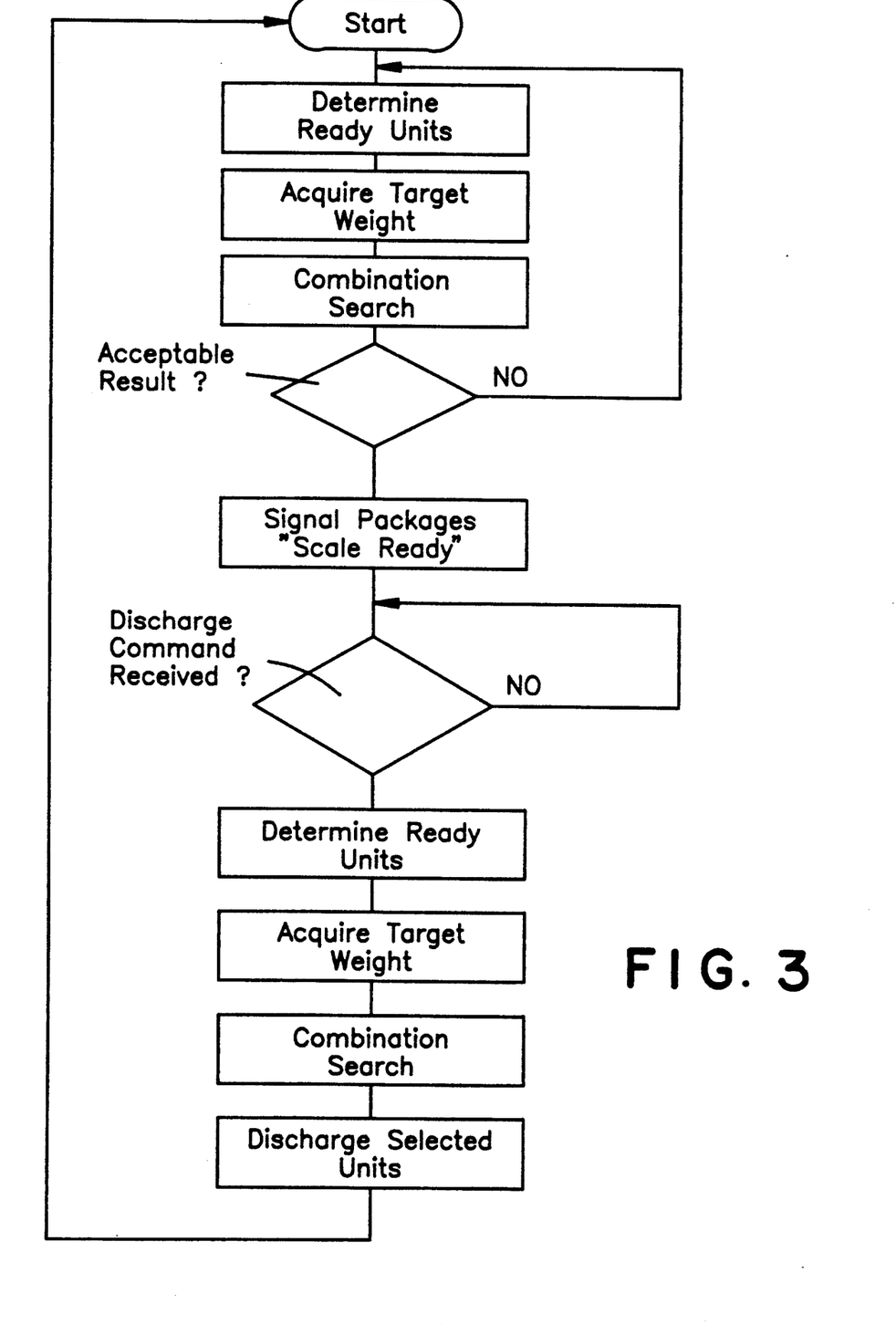
FIG. 3 is a flow chart which shows the program logic for a combination weigher according to a first embodiment of the invention.
Figure 4:
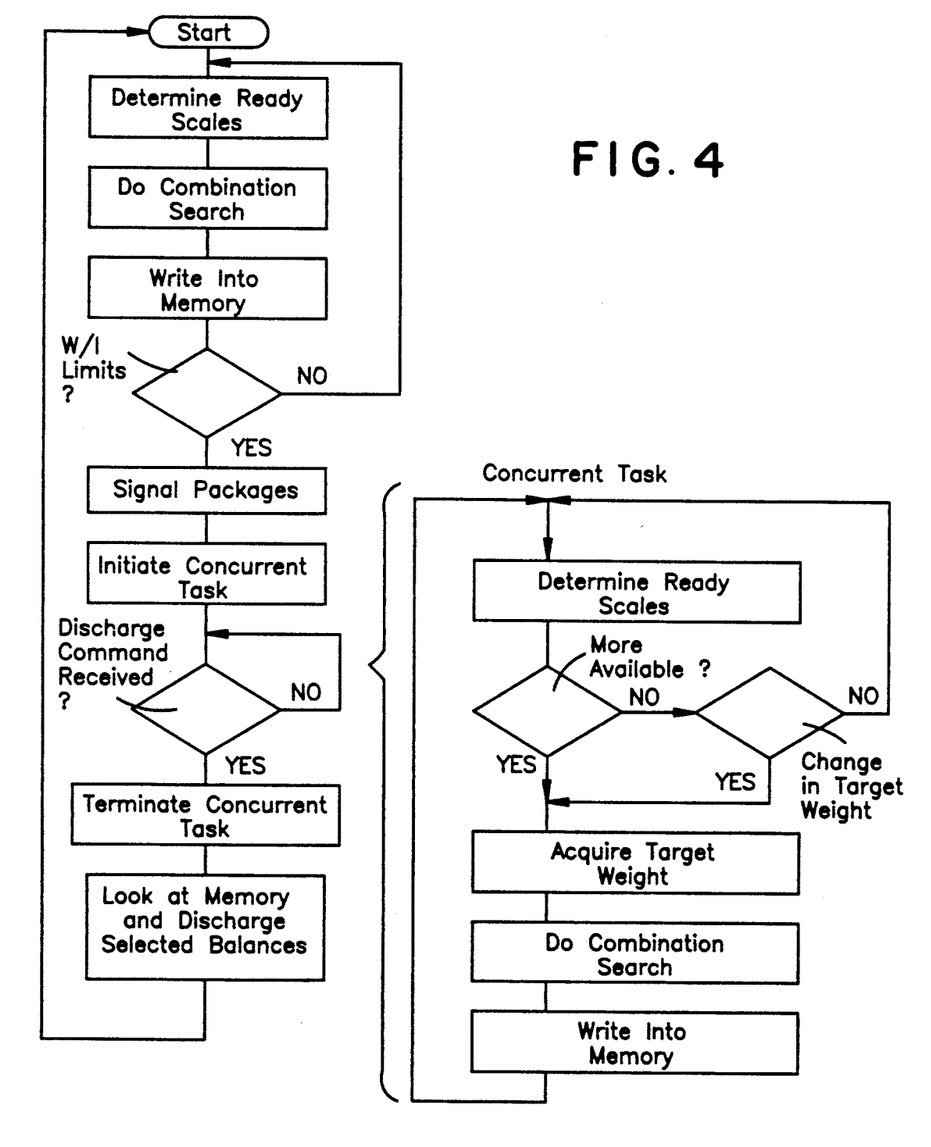
FIG. 4 is a flow chart which shows the program logic for a combination weigher according to a second embodiment of the invention.
Figure 5:
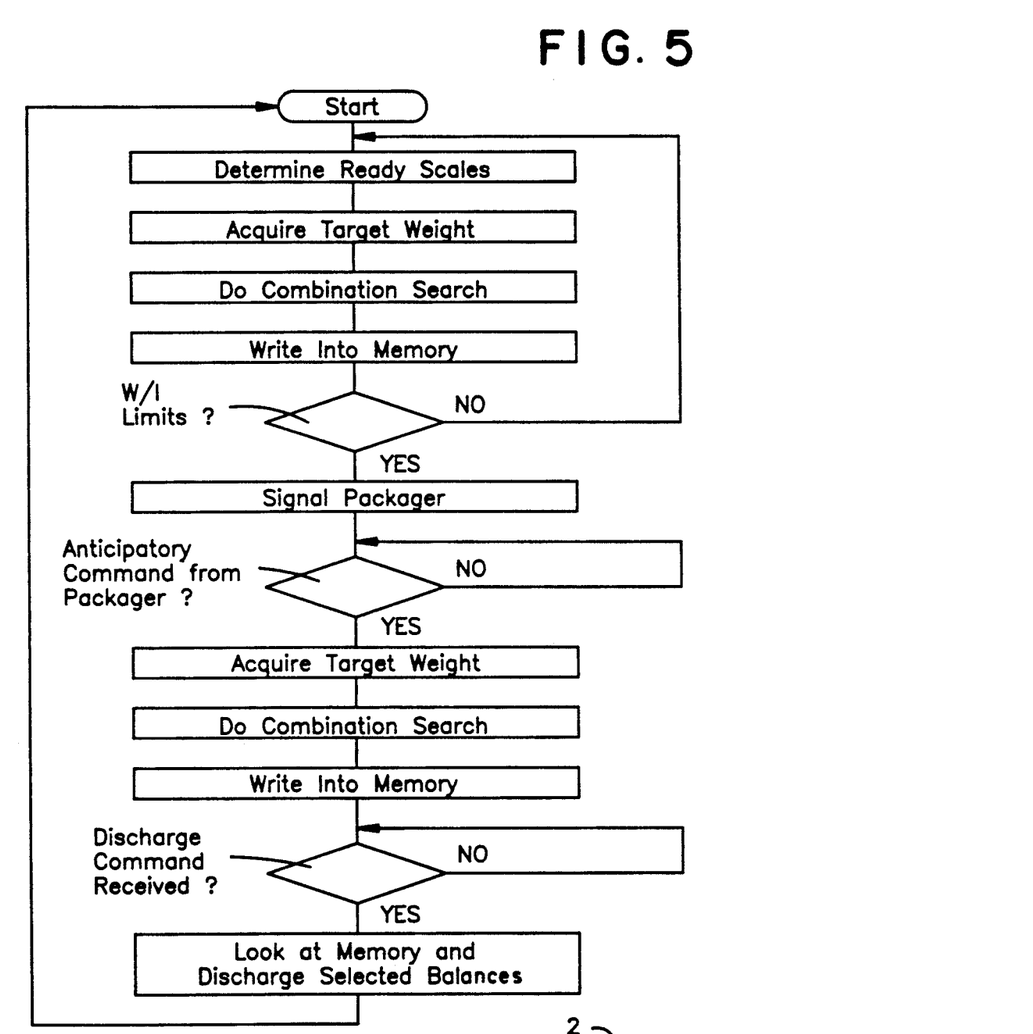
FIG. 5 is a flow chart which shows the program logic for a combination weigher according to a third embodiment of the invention.
Figure 6:
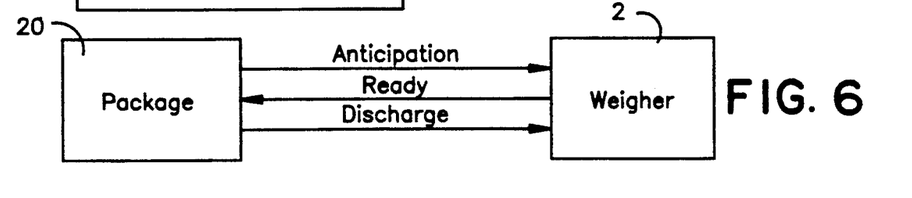
FIG. 6 is a schematic illustration of a package machine and combination weigher which shows a signal sequence which passes between the two machines.

The program logic for various embodiments of the invention are shown in FIGS. 3 through 5. The details of the program have not been show since they may take numerous forms, all of which are well within the knowledge of those of ordinary skill in the art of programming combination weighers.

As shown in FIG. 3, the program is initiated with a start signal and a predetermined target weight is entered (not shown). Thereafter, each of the balances is scanned to determine if the balance "is ready" for a combination search. For example, a balance is ready if it contains a weight within acceptable limits and is in a steady state. As previously indicated, one approach for indicating ready scales is shown in the aforementioned Yamada et al. patent. A combination search is then performed on the ready balances and a combination of balances selected which most closely approximates the previously entered target weight.

If an acceptable combination is not found, the program returns to the determine ready units step and the process is repeated until an acceptable combination is selected. At this point, a signal is sent to a packaging machine as illustrated by the line (a) in FIG. 2, indicating that the scale is ready to discharge a combination of balances.

The logic of the machine is programmed to wait for a discharge command as illustrated by the go-no go loop N. However, as soon as a discharge command is received (line (b) in FIG. 2), each of the balances, including any balances which have become ready since an initial scan, are scanned and a second combination search is performed on all ready scales including those identified in the initial scan, as well as those that have become ready since the initial combination search. The scale then discharges the selected units or balances based on the most recent combination search and initiates another cycle. For example, the second cycle may be initiated by the discharge step.

The program logic for a second embodiment of the invention is illustrated in FIG. 4. The logic for this embodiment is generally similar to that of the first embodiment but includes a write into memory step and a concurrent task routine to upgrade the memory. The program also includes a step for terminating the concurrent task routine before a final selection process, i.e., a look at memory and discharge selected balances step in the event that the discharge command arrives during a search.

Figure 7:
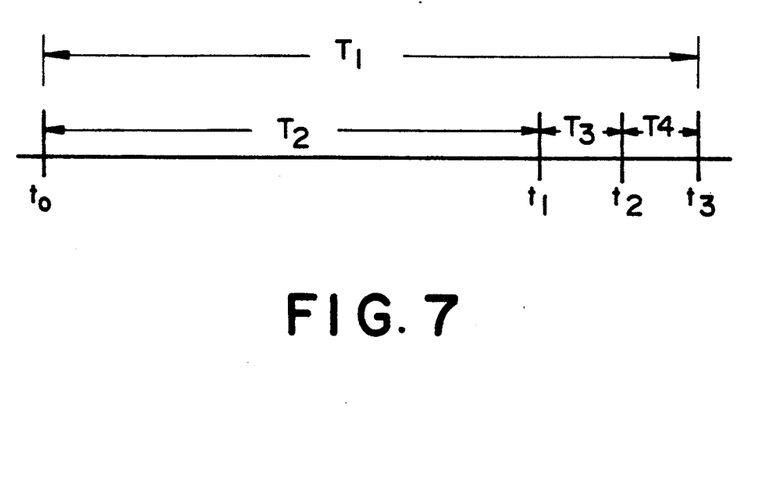
FIG. 7 is a schematic illustration of the timing sequence for the operation of a combination weigher in accordance with one embodiment of the invention.
Figure 8:
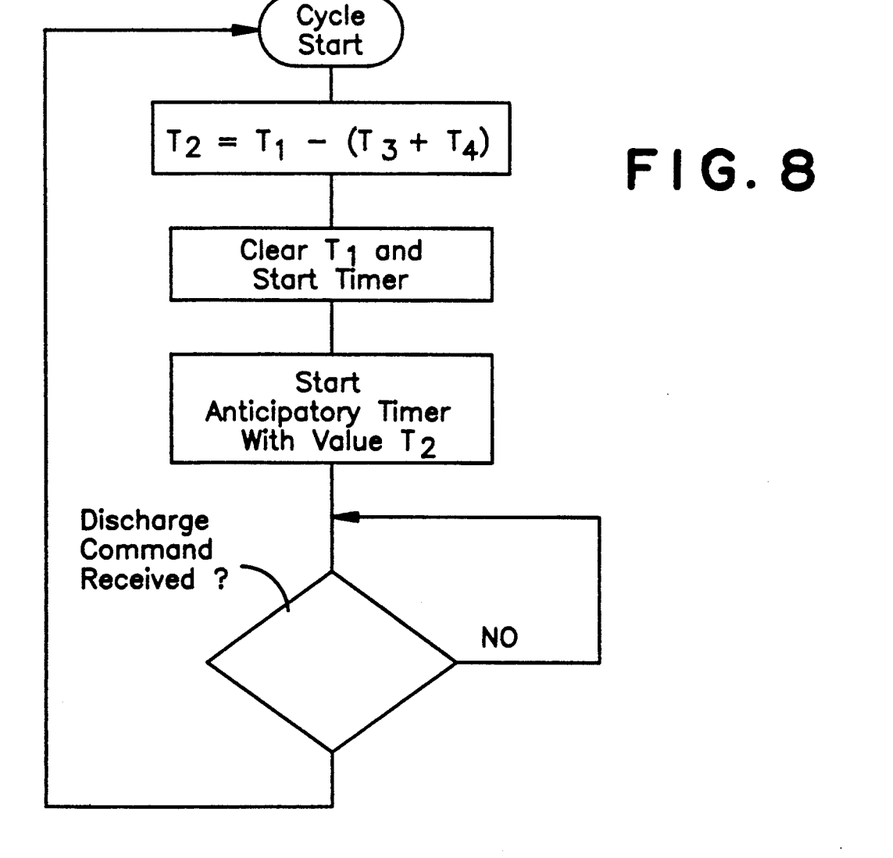
FIG. 8 is a flow chart which shows the timing sequence for a combination weigher in accordance with the embodiment of FIG. 7.

A third embodiment of the invention will be described in connection with FIGS. 5, 7 and 8. In this embodiment, an anticipatory command signal triggers a combination search in response to an internal timer or a response from a packaging machine. An interval of time is provided between the anticipatory command signal and a discharge command signal so that a combination search and selection will be completed almost immediately before the discharge command signal is given. For example, a suitable timing sequence is shown in FIGS. 7 and 8, wherein:

$t_0$ = start of next cycle (discharge point of last cycle)
$t_1$ = combination search step initiated
$t_2$ = weigher ready signal to packages
$t_3$ = weigher discharge command ($t_0$ for next cycle)
$T_1$ = cycle time of packager
$T_2$ = delay from cycle start timer (last discharge)
$T_3$ = combination search time (a constant)

$$T_2 = T_1 - T_3 + \text{"cushion"}$$

A first method for weighing a plurality of articles of product having varying weights and delivering a collection of the weighed articles having a combined weight which is at least equal to and most nearly approximates a predetermined target weight will be described with reference to the following definitions. It should be understood, however, that the methods described can be implemented with discreet logic or computer programs with one or more processors and that they can also be implemented with appropriate electronic circuitry.

It should also be recognized that in describing the method according to this preferred embodiment of the invention, each product hopper can take on various stages as set forth below.

| Mnemonic | Description |
| --- | --- |
| IsReady | Product Hopper has product of known weight and is available for search step. |
| IsUnloading | Product Hopper is in the process of unloading. |
| IsEmpty | Product Hopper has completed the unloading process. |
| IsRefilling | Product Hopper is in the process of reloading with product. If the Product Hopper is on a weight measuring device, then process of settling and measuring the weight may be included in this state. |
| IsTaring | Product Hopper is not ready because weigh unit is acquiring tare value. |
| IsSpanning | Product Hopper is not ready because weigh unit is acquiring span value. |
| IsDefective | An error has been detected with the unit. |
| IsOff | Operator has enabled the unit for cleaning or maintenance. |

Thus, for a combination weigher consisting of n product hoppers, two arrays, S[n], the current state of, and W[n], the weight in, each product hopper can be defined.

Therefore, when a request for a discharge from the combination weigher is received from the external machine (or internally operated) then the following steps are performed:

(a) The status array (S[n]) is scanned to identify the set (r') of product hoppers that are ready, i.e., S[r'] = IsReady;

(b) Perform the combination search using the weight values in array (W[r']) only for those product hoppers in the set (r') from step (a). The search yields the set (s') which represents the weigh hoppers which, when unloaded, will provided the selected weight;

(c) Signal the unloading of those product hoppers, s', which were selected by a combination search. Set the Status of these product hoppers to IsUnloading, e.g., S[s'] = IsUnloading;

(d) Concurrently with the unloading of the selected hoppers in step (c), signal the external machine that a discharge from the combination weigher has been initiated. This step is not a necessity of the combination weigher control, but rather a typical approach to provide proper synchronization between the weigher and the external machine. Note that the timing, or even the necessity, of this discharge acknowledgement signal is defined by the requirements of the external machine.

(e) When the selected product hoppers, s', in step (e) have completed the unloading step, start the refilling sequence and update their status, e.g., S[s']=IsRefilling.

(f) When the product hoppers in step (e) have completed the refilling step, record the new weights in array W[s'] and update the Status array, e.g., S[s']=IsReady.

The above steps are repeated each instance of a command to discharge, i.e., request from the packaging machine for a discharge. An intrinsic benefit of the above method is that all available (IsReady) product hoppers are included in the combination search at the instant that the discharge is needed. This ensures the best efficiency (the probability of finding an acceptable combination) and accuracy. However, if a signal from the external machine is generated before any additional product hoppers reach an IsReady state, the selected hoppers will be immediately unloaded.

The operation of the apparatus in accordance with the present invention will now be described in connection with two operating scenarios.

Slow discharge rates

If the packaging machine is slow relative to the unloading and reloading of the product hoppers, then all previously selected product hoppers will be available for the next search. However, the apparatus disclosed in the previously mentioned U.S. Pat. No. 4,470,166 patent would exclude the set of product hoppers which were selected on the prior discharge which would result in a significant decrease in accuracy.

Thus, using the control method according to the present invention provides increased capability over the prior art. For maximum versality, the combination weigher control method should accommodate discharge weights (or volume for light density products) that require a relatively large number of product hoppers to make up the required weight. For example, a combination weigher with fourteen product hoppers may typically need to unload six to eight product hoppers to satisfy the combination search. In the prior art, where a combination search is initiated, excluding the product hoppers unloaded and before the packaging machine needs the next discharge, at best the combination search will not be successful. At worst, a combination will be found with the remaining product hoppers but invariably the resulting weight will be less accurate than if the combination search was initiated when the packaging machine was ready for the next discharge which, in this example, provides time for the unloaded product hoppers to become reloaded and participate in the combination search.

High discharge rates

As the discharge rate of the combination weigher is increased, the product hoppers in the process of unloading and reloading may not be ready (IsRefilling) when the next request for discharge occurs. In this instance, product hoppers unloaded on the previous cycle are not considered in the next combination when the request for discharge arrives, since the product hoppers have not had sufficient time to reach the IsReady state. This timing condition is sometimes referred to as "double-shifting" because the partial superposing of two machine cycles. At even higher discharge rates, the product hoppers from the previous two discharges may not have had time to reach the IsReady state, therefore the next combination search and resulting discharge will result in "triple-shifting." By making the code reentrant which executes the functions of unloading and reloading the product hoppers can be accommodated ("n-shifting").

In a typical embodiment of the present invention it is possible to select one or more product hoppers for a tare or span check. In this instance, the status of those selected hoppers would set the corresponding IsTaring or IsSpanning status. As the tare and span cycles complete, the reloading of those hoppers would be initiated with the status set to IsRefilling. Once refilled, the weight value in W[n] would be updated and the status in S[n] set to IsReady.

Note that the taring and spanning may be asynchronous with other operations of the combination weigher. This also applies to other states such as IsOff or IsDefective.

Some packaging machines require a signal from the combination weigher indicating that it is "ready" prior to the packaging machine issuing the actual discharge command. This is typical in packaging machines that must start the next cycle of their operation in anticipation that, at some time later, the command to discharge the combination weigher will be successful.

One approach to implementing this requirement is to provide a product trap (holding hopper) between the combination weigher and the packaging machine. The product trap is fitted with unloading means and a sensor (or logic) that indicates if product is present. The combination weigher discharges an initial charge of product into the trap. The packaging machine inspects the product-present sensor in the trap and, if true, commits to a cycle and the packaging machine signals the trap to unload at the appropriate time. When the product trap is unloaded, the combination weigher is signaled to discharge, thereby refilling the product trap. With this interface method, the product trap provides the "ready" signal for the packaging machine and the combination weigher can operate with the discharge request control method described above.

Many applications do not require a product trap, except to provide "ready" interface capability for the packaging machine. If the combination weigher had a control method that provided a "ready" output signal, the product trap, with its complexity and cost, could be eliminated. The challenge is to provide a method that "looks ahead" and finds a combination of product hoppers that meet the weight criteria. The set of product hoppers selected can have a new state, IsSelected. The combination weigher can now send a "ready" signal to the packaging machine. However, when the actual discharge request signal arrives from the packaging machine, an additional combination search is made on all IsReady and IsSelected product hoppers as a group (i.e., a new combination search is made on all ready units, even those previously selected, but not unloaded). If this new search results in a better discharge weight than the set designated IsSelected, then those selected in the new search will have their status to IsUnloading and the unloading/reloading process initiated, as already described, and all product hoppers with the status IsSelected are returned to the pool of ready units by setting their status to IsReady. On the other hand, if the new search does not yield a better discharge weight (or the same set of product hoppers were available) then all IsSelected units are set to IsUnloading, etc. This control method provides the "ready" output signal required by the packaging machine while retaining all the benefits derived by performing the combination search at the time the discharge is needed.

In fact, the Hirano patent, U.S. Pat. No. 4,470,166, alludes to the benefit (time savings). Current implementations, hardware or software approaches, can perform the combination search in about 50 milliseconds or less. However, for applications operating at very high cycle rates, or where the cost of the control circuit must be kept at a minimum, performing the combination search at the instant that the combination weigher is commanded to discharge may present an unacceptable delay in operation. A variation on the control method just described can provide high speed, low implementation cost and the benefits of considering all available product hoppers in the combination search.

As described, a combination search can be performed on the IsReady product hoppers to establish a set of IsSelected units. This enables the combination weigher to issue a "ready" signal to the packaging machine. One of two events will occur next. Either the discharge command will arrive, or product hoppers previously unloaded will become IsReady. Should the discharge command arrive first, then the IsSelected units are unloaded, etc., as already described. However, if any product hoppers change to the IsReady state, then a new combination search is initiated with all IsSelected and IsReady units. If the discharge command arrives before this new search is completed, then the IsSelected units are unloaded. If the combination search is completed, then the newly selected units are designated IsSelected and any previously IsSelected units that are not now selected are returned to the IsReady state. This control method performs the combination search during non-critical time and ensures that all available product hoppers are considered in the combination search up to the instant the discharge command is received.

Should the discharge command arrive while a combination search is in process, the combination search can be aborted or the search can be allowed to run to completion with its results ignored (i.e., the result is not used to update the product hopper status array).

A further advantage in using the present apparatus is that the step of acquiring the target weight before a second combination search provides for a change in the preselected target weight in mid-cycle, i.e., after the initial combination search and before a second search.

While the invention has been described in connection with the preferred embodiments, it should be understood that changes and modifications may be made without departing from the scope of the claims.

What is claimed is:

1. A combination weigher for weighing a plurality of articles of product having varying weights and delivering a collection of the weighed articles having a combined weight which most nearly approximates a predetermined target weight comprising:

means for including a plurality of balances, each of which receives and weighs a fraction of the collection to reach a ready state;

means for recording a predetermined target weight;

control means for determining which of said balances is in a ready state;

generating and comparison means for generating the values of combinations of weights on the balances which are in the ready state and comparing the values with the predetermined target weight and for selecting an initial combination of balances having a combined weight which most nearly approximates the target weight;

signal generating means for producing a signal indicating that a combination of scales is ready for discharge; discharge command means with delay;

means for generating the value of a combination of weights on the balances which are in the ready state including the previously selected balances and any balances which have reached a ready state after the initial comparison in response to said discharge command means with delay and for comparing the values with the predetermined target weight so that all available ready balances are included in the comparison and selecting a second combination of weights which more closely approximates the target weight;

product receiving means;

means for unloading the balances of the second selected combination for delivery to said product receiving means;

means for loading the balances which were unloaded; and means for initiating operation of said generating and comparing means in response to the unloading of the selected balances.

2. A combination weigher according to claim 1 in which said discharge command means is activated by a timer.

3. A combination weigher according to claim 1 in which said discharge command means is activated by said product receiving means.

4. A combination weigher for weighing a plurality of articles of product having varying weights and delivering a collection of the weighed articles having a combined weight which most nearly approximates a predetermined target weight comprising:

means including a plurality of balances, each of which receives and weighs a fraction of the collection to reach a ready state;

means for recording a predetermined target weight;

control means for determining which of said balances is in a ready state;

generating and comparison means for generating the values of combinations of weights on the balances which are in the ready state and comparing the values with the predetermined target weight and for selecting an initial combination of balances having a combined weight which most nearly approximates the target weight;

means for writing into memory the weights on each of said scales;

means including a concurrent task routine for determining ready scales including the scales which had previously been determined to be ready as well as any scales which have become ready since the selection of the initial combination by said generating and comparison means and for generating the values of combinations of weights on all of the ready balances including any balances which have reached a ready state after the initial comparison, selecting a combination of weights which most closely approximates the target weight and writing the selected scales into memory;

means for terminating the concurrent task routine;

product receiving means;

means for unloading the balances of the second selected combination for delivery to said product receiving means;

means for loading the balances which were unloaded; and means for initiating operation of said generating and comparing means in response to the unloading of the selected balances.

5. A method for weighing a plurality of articles of product having varying weights and delivering a collection of the weighed articles having a combined weight which most nearly approximates a predetermined target weight comprising the steps of:

provviding a plurality of balances, each of which receives and weighs a fraction of the collection to reach a ready state;

recording a predetermined target weight;

determining which of said balances is in a ready state;

generating the values of combinations of weights on the balances which are in the ready state and comparing the values with the predetermined target weight and selecting an initial combination of balances having a combined weight which most nearly approximates the target weight;

producing a signal indicating that a combination of scales is ready for discharge;

generating the value of a combination of weights on the balances which are in the ready state including the previously selected balances and any balances which have reached a ready state after the initial comparison and for comparing the values with the predetermined target weight so that all available ready balances are included in the comparison and selecting a second combination of weights which most closely approximates the target weight;

providing a package for receiving the product from the selected combination of balances;

unloading the balances of the second selected combination for delivery to the package;

loading the balances which were unloaded; and initiating operation of the first generating and comparing steps in response to the unloading of the selected balances.

6. A method for weighing a plurality of articles of product having varying weights and delivering a collection of the weighed articles having a combined weight which most nearly approximates a predetermined target weight to a package comprising the steps of:

providing a plurality of balances, each of which receives and weighs a fraction of the collection to reach a ready state;

recording a predetermined target weight;

determining which of said balances is in a ready state;

generating the values of combinations of weights on the balances which are in the ready state and comparing the values with the predetermined target weight and selecting an initial combination of balances having a combined weight which most nearly approximates the target weight;

writing into memory the weights on each of said scales;

initiating a concurrent task routine for determining ready scales including the scales which had previously been determined to be ready as well as any scales which have become ready since the selection of the initial combination and generating the values of combinations of weights on all of the ready balances including any balances which have reached a ready state after the initial comparison step, selecting a combination of weights which most closely approximates the target weight and writing the selected combination into memory;

terminating the concurrent task routine;

providing a package for receiving the product from the selected combination of balances;

unloading the balances of the second selected combination for delivery to the package;

loading the balances which were unloaded; and initiating operation of the first generating and comparing steps in response to the unloading of the selected balances.

* * * * *